UNITED STATES PATENT OFFICE.

EMIL KNOEVENAGEL, OF HEIDELBERG, GERMANY.

COMPOUNDS OR DERIVATIVES OF CELLULOSE AND PROCESS OF OBTAINING THE SAME.

1,090,074. Specification of Letters Patent. Patented Mar. 10, 1914.

No Drawing. Application filed August 20, 1906. Serial No. 331,399.

*To all whom it may concern:*

Be it known that I, EMIL KNOEVENAGEL, professor of chemistry, a subject of the German Emperor, residing at Heidelberg, in the Grand Duchy of Baden, Germany, have invented certain new and useful Compounds or Derivatives of Cellulose and Process for Obtaining the Same, of which the following is a specification.

It is known that cellulose is capable of yielding acid derivatives, among which the nitric acid and the acetic acid derivatives in particular have acquired commercial importance.

It has been found, that derivatives of cellulose with sulfinic acids and organic acids are formed, if cellulose or a material containing cellulose or hydrocellulose or oxycellulose or analogous compound is brought together with sulfinic acid in the presence of an anhydrid of an organic acid with or without a suitable solvent, such as glacial acetic acid. If a sufficient quantity of a suitable solvent is present, the cellulose is thereby caused to dissolve, while forming acid derivatives of cellulose, which partly contain sulfur, and partly are free from sulfur. In the absence of sulfinic acid, such a transformation of the cellulose does not take place. The effect produced by sulfinic acids is similar to that which is already known to be produced by sulfuric acid or by aromatic sulfo-acids for the manufacture of acetates of cellulose.

From the experience with sulfuric acid and aromatic sulfo-acids such an effect of the sulfinic acids could not be expected, in view of the fact, that in the manufacture of acetates from cellulose the sulfuric acid cannot be replaced by the similarly constituted sulfurous acid, and that sulfinic acids are considered derivatives of sulfurous acids.

Although the composition of sulfinic acids is analogous to that of sulfurous acid, the two groups of acids differ essentially as regards their chemical and physical properties.

In comparison with the use of sulfuric acid and aromatic sulfonic acids the use of sulfinic acids for the manufacture of acid derivatives of cellulose offers material advantages, inasmuch as solutions prepared with sulfinic acids may be kept for months without reducing their viscosity, and that solutions which are prepared with a comparatively large quantity of sulfinic acid, may be boiled down *in vacuo* at a temperature up to 80° C., to almost complete dryness, without undergoing decomposition. My acetyl-cellulose is a mixture probably of di- to tetra-acetyl-celluloses, from very slightly hydrated celluloses. Their formation, for instance in the case of tri-acetyl-cellulose, may be represented by the following equation:

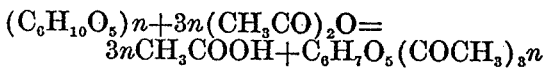
$$(C_6H_{10}O_5)n + 3n(CH_3CO)_2O = 3nCH_3COOH + C_6H_7O_5(COCH_3)_3n$$

which is not the case with acetate solutions prepared with sulfuric acid or with aromatic sulfonic acids. Solutions prepared with sulfinic acids are therefore suitable for producing artificial silk by being drawn to threads directly in air or in suitable precipitants, whereas in the older processes the acetates must first be precipitated and relieved of the adherent acid by washing, before they yield solutions capable of being spun into threads. This behavior of sulfinic acids in solutions and in acid derivatives of cellulose obtainable therefrom is probably due to the known property of sulfinic acids to combine with aldehydes and ketones to derivatives, whereby the strong acid action and decomposing action of sulfinic acids is removed. The acid derivatives and solutions of the same, prepared by means of sulfinic acids are applicable for the manufacture of artificial silk, substances resembling celluloid, films and similar products.

The following example serves to show the details of procedure: 1 part of cellulose, for instance cotton wool, is introduced into a mixture of 5 parts of acetic anhydrid, 4 parts of glacial acetic acid and 0.1–0.2 parts of benzene-sulfinic acid and the mixture heated to about 50° C. for about 10–24 hours. At the end of this time a clear viscous solution has been formed which will not lose its viscosity, even when allowed to stand for a considerable time, and which when allowed to evaporate, leaves behind films or threads of great strength. By water or alcohol the acetyl-cellulose may be precipitated from its solution.

At the temperature of an ordinary living room, about 12 days are required for dissolving the cellulose by the means described above.

Instead of benzene-sulfinic acid in the above example, other sulfinic acids may be used, instead of acetic anhydrid, anhydrids of other organic acids, and instead of cellulose, a substance containing cellulose, hydrocellulose or similar compound may be used.

What I claim is:—

1. As a new chemical product, a viscous solution of acetyl-cellulose containing a sulfinic acid, retaining its viscosity unaltered for months and not undergoing decomposition, when boiled down *in vacuo* to almost complete dryness at temperatures up to 80° C., substantially as described.

2. As a new chemical product, a viscous solution of acetyl-cellulose directly obtained by the acetylation of cellulose in the presence of a sulfinic acid, the said viscous solution containing a sulfinic acid and the products of its chemical change, retaining its viscosity unaltered for months and not undergoing decomposition, when boiled down *in vacuo* to almost complete dryness at temperatures up to 80° C., substantially as described.

3. The process for the manufacture of derivatives of cellulose, which consists in causing a sulfinic acid to act on cellulose in the presence of an organic acid anhydrid and a solvent of cellulose, substantially as described.

4. The process for the manufacture of a derivative of cellulose, which consists in dissolving cellulose in a mixture of glacial acetic acid, benzene-sulfinic acid and acetic anhydrid, substantially as described.

In testimony whereof I have set my hand in the presence of two subscribing witnesses.

EMIL KNOEVENAGEL.

Witnesses:
   OSWALD KRUG,
   H. W. HARRIS.